United States Patent [19]

Ching-Hwei

[11] Patent Number: 4,825,191
[45] Date of Patent: Apr. 25, 1989

[54] AUTOMOBILE MULTI-PURPOSE AUXILIARY INDICATOR

[76] Inventor: Lan Ching-Hwei, 65, Hsiang-Shih Road, Sec. 2, Pan-Chiao, Taipei Hsien, Taiwan

[21] Appl. No.: 89,673

[22] Filed: Aug. 26, 1987

Related U.S. Application Data

[63] Continuation-in-part of Ser. No. 891,105, Jul. 29, 1986, abandoned.

[51] Int. Cl.4 .............................................. B60Q 1/52
[52] U.S. Cl. .................................... 340/472; 340/475; 340/479
[58] Field of Search .................... 340/52 F, 66, 67, 69, 340/71–74, 81 R, 82, 84, 85, 87, 90, 94, 107–111, 321; 40/591, 593, 903; 116/35 R, 35 A, 63 T; 362/61, 252; 160/10, 60, 95, 97, 103, 130, 135, 152, 157, 174, 351

[56] References Cited

U.S. PATENT DOCUMENTS

| | | | |
|---|---|---|---|
| 1,714,353 | 5/1929 | Edmonston | 340/94 |
| 1,746,120 | 2/1930 | Lechner | 340/94 |
| 3,501,742 | 3/1970 | Ellison | 340/66 |
| 4,020,458 | 4/1977 | Windisch | 340/67 |
| 4,430,638 | 2/1984 | Parker | 340/90 |
| 4,449,167 | 5/1984 | Cohen | 362/61 |
| 4,575,189 | 3/1986 | Johnson | 116/35 A |
| 4,613,847 | 9/1986 | Scolari et al. | 340/87 |

FOREIGN PATENT DOCUMENTS

| | | | |
|---|---|---|---|
| 3509585 | 9/1986 | Fed. Rep. of Germany | 340/81 R |
| 0404577 | 1/1934 | United Kingdom | 340/94 |

*Primary Examiner*—Joseph A. Orsino
*Assistant Examiner*—Brent A. Swarthout
*Attorney, Agent, or Firm*—Ostrolenk, Faber, Gerb & Soffen

[57] ABSTRACT

An auxiliary multi-purpose signaling indicator for a vehicle is constructed of three elongate sections which include a central section which lights when the brake of the car is depressed and left and right sections which flash for indicating left and right turns. Normally the three sections are arranged along a straight line and operate in a mode which is conventional for brake and turn indicators. In case of an emergency, the left and right turn sections of the signaling device may be bent toward each other to configure the device into a triangular shape. Each side of the triangle contains one of the indicators. The distal ends of the left and right sections are linked mechanically and electrically such that activation of the emergency flasher of the vehicle provides a triangularly shaped flashing light beam.

16 Claims, 4 Drawing Sheets

A-A SECTION

AUTOMOBILE MULTI-PURPOSE AUXILIARY INDICATOR

BACKGROUND OF THE INVENTION

This application is a continuation in part of application Ser. No. 891,105, filed July 29, 1986, now abandoned.

The present invention relates to a multipurpose auxiliary signaling device for vehicles and, more particularly, to a signaling device with three indicator sections, each section respectively signaling a left turn, a right turn, and braking of the vehicle. The device can be bent into the shape of a triangle and all its indicators flashed simultaneously to provide a hazard warning mark.

Conventional automobile auxiliary signaling devices are available with three individual indicators for signaling respectively a left turn, braking, and a right turn of the vehicle. The indicators are arranged horizontally and the braking indicator is located between the turning indicators. The position of the left and right indicators relative to the central braking indicator is fixed, and the vehicle operator can not adjust the positions of the indicators relative to one another.

Triangularly shaped indicators which emit light from each side of the triangle have been accepted in many parts of the world to signal a hazardous condition. However, conventional auxiliary signaling devices of vehicles do not provide the option of being transformed into a hazardous condition indicator.

SUMMARY OF THE INVENTION

It is an object of the present invention to provide a multi-purpose auxiliary signaling device for automobiles and other vehicles which can be transformed for use as a hazard signaling device.

It is another object of the present invention to provide a multi-purpose auxiliary signaling device as set forth above which is constituted of a central braking indicator, flanked by left and right turn indicators.

It is a further object of the present invention to provide an auxiliary signaling device as set forth above which has the further capability of being restructured into a triangular, hazard indicating, signaling device.

It is yet another object of the present invention to provide a multi-purpose auxiliary signaling device for automobiles which is simple in construction and easily configurable into either a hazard flashing device or an ordinary automobile signaling device.

It is yet a further object of the present invention to provide an ability in the multi-purpose auxiliary signaling device of the present invention to simultaneously flash all indicator sections of the signaling device.

The present invention realizes the foregoing and other objects with a three section automobile auxiliary signaling device which includes a centrally located brake light and left and right turn lights which are respectively disposed to the left and to the right of the brake light. Preferably, the three sections of the auxiliary signaling device are arranged along a straight line, and each section is of a tubular shape, so that the light beam of each section appears as a short, relatively thick, line.

The left and right turn indicator sections are flexibly connected to the brake indicator in a manner which permits the orientation of the left and right indicators to be freely adjusted relative to the brake indicator. More specifically, the left and right indicators can be bent far enough that their distal ends meet, then giving the signaling device the shape of a triangle. The distal ends of the left and right indicators have interconnectable electrical connection points or posts which enable the indicators to be mechanically and electrically interconnected.

Preferably, one of the turn indicators has a snap ring and the other indicator has an annular slot. To transform the ordinary auxiliary signaling device into a hazard flasher, the turn indicators are bent toward each other and the snap ring is engaged in the annular slot. This also completes an electrical connection between the brake indicator and one of the turn indicators and mechanically links the turn indicators. Subsequent activation of the conventional hazard flashing switch of the automobile causes all sections of the now triangularly shaped auxiliary signaling device to flash simultaneously.

Other features and advantages of the present invention will become apparent from the following description of a preferred embodiment of the invention which refers to the drawings which follow.

DETAILED DESCRIPTION OF THE PREFERRED EMBODIMENT

Figure 1:
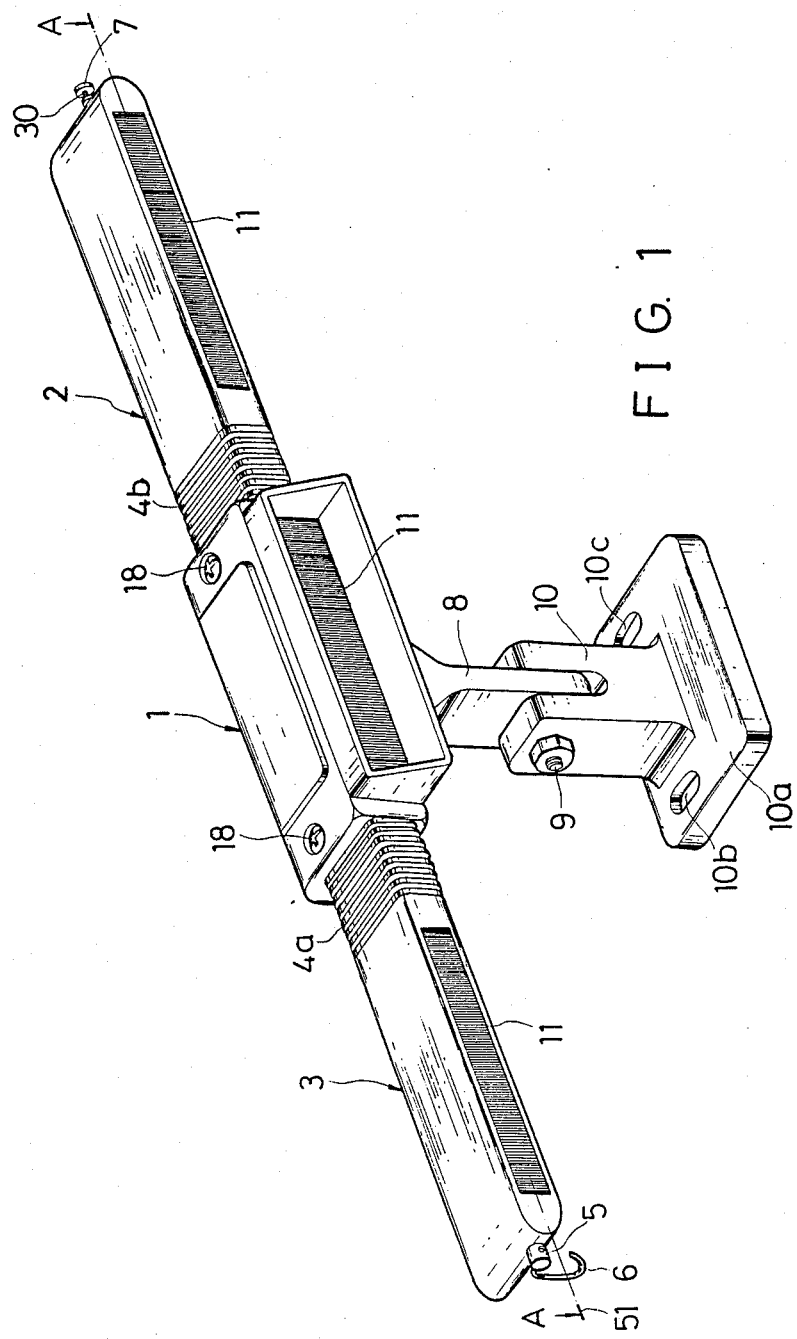
FIG. 1 is a perspective view of the signaling device of the present invention in which the three indicator sections are aligned on a straight line.
Figure 2:
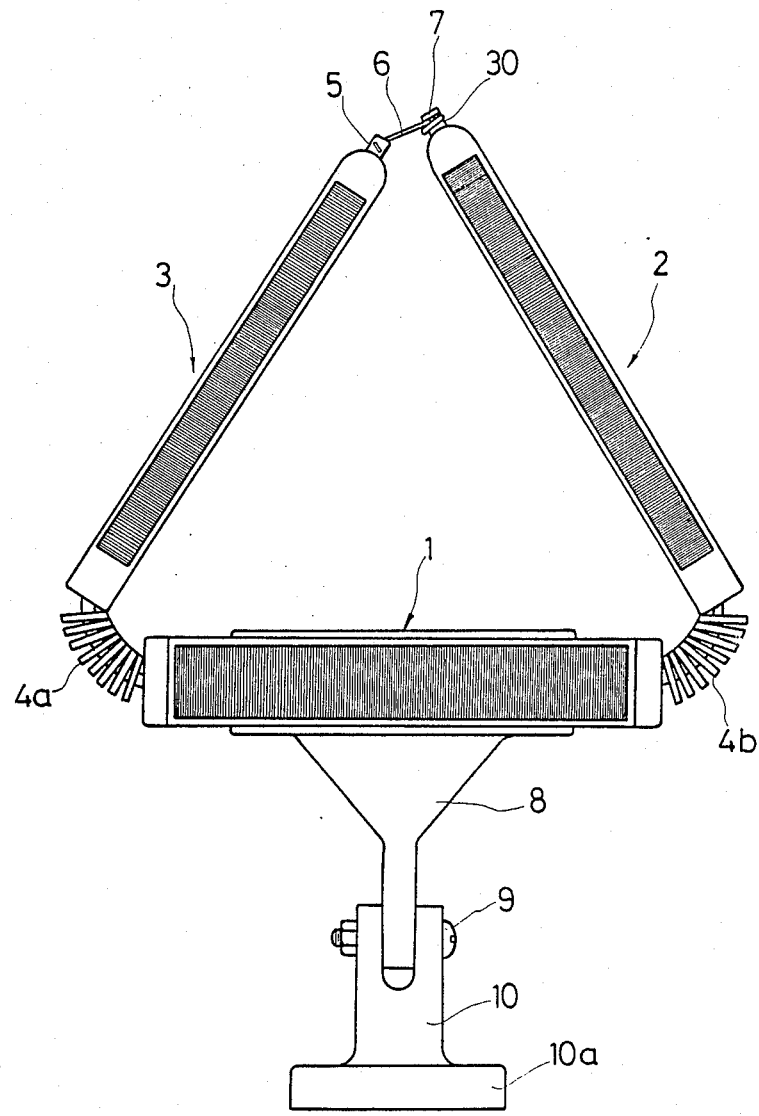
FIG. 2 illustrates the signaling device of FIG. 1 in a mode wherein the left and right turn indicators are bent to give the device a triangular, hazard indicating, shape.
Figure 3:
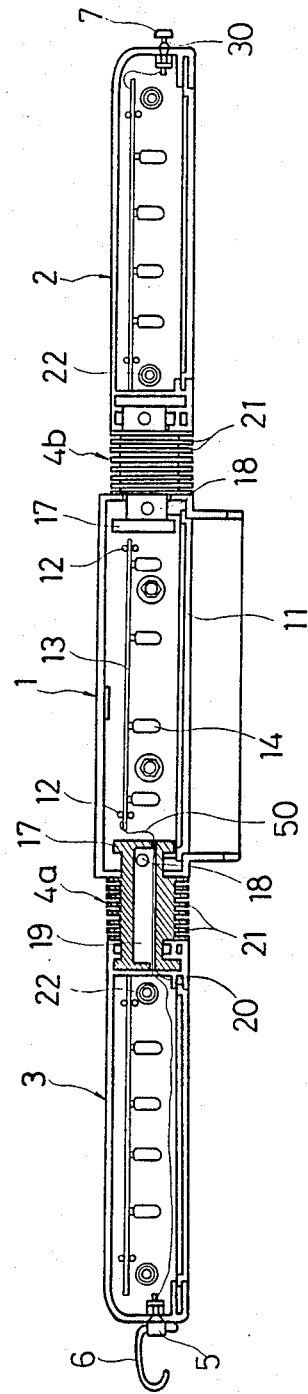
FIG. 3 is a cross-sectional view, along line A—A of FIG. 1.

Referring to FIGS. 1-3, the auxiliary signaling device of the present invention includes an auxiliary brake indicator 1, an auxiliary left turn indicator 3 and an auxiliary right turn indicator 2. In FIG. 1, the three indicators are aligned along a horizontal straight line 51.

The left and right turn indicators 3, 2 are joined to brake indicator 1 by respective flexible connection bodies 4a and 4b. A connection post 5 and a snap ring 6 which are provided at the distal end of left turn indicator 3 are designed to snap onto a protruding wire connection post 7, defining an annular slot 30, which is located on the distal end of right indicator 2, when indicators 2 and 3 are bent toward each other as in FIG. 2.

The entire signaling device is supported on a connection block 8 which contacts brake indicator 1. Connection block 8 is, in turn, pivotally mounted to a seat 10 having a base 10a and slots 10b and 10c which enable the base 10a to be secured to a suitable surface on the vehicle (not shown). A bolt 9 provides the pivoting connection between connection block 8 and seat 10. The viewing angle of the signaling device is thereby adjustable.

As shown in greater detail in FIG. 3, a red colored transparent plate 11 is clamped by the front part of a shell body of the brake indicator 1. Two pairs of protruding pins 12 are disposed in the shell relative to a printed circuit board 13 on which a plurality of light bulbs 14 are located. Conduction wires (not shown) lead from the bulbs 14 to the vehicle's factory installed brake signaling line 15 (see FIGS. 4 and 5). The grounded side of the bulbs 14 is connected to a ground contact line 16 (FIGS. 4 and 5) of the vehicle body.

A respective catch slot 17 is located at each end of the shell body of brake indicator 1. Each slot 17 respectively secures and is mated to one of connection bodies 4a and 4b which in turn support left and right indicators 3 and 2. The bolts 18 connect the shell cover, the connection bodies 4a add 4b and the shell body to one another. Thus, that end of connection bodies 4a and 4b which lies adjacent the shell body of brake light 1 is secured in place. The other end of connection bodies 4a and 4b is respectively secured to left turn indicator 3 and right turn indicator 2.

Connection bodies 4a and 4b are constructed of rubber or similar elastomeric materials. A soft metal plate 19 extends through the center of connection bodies 4a and 4b and a tunnel 20 is provided adjacent the soft metal plate 19, forming a conduit for a conduction wire 50 which connects the bulbs 14 of brake indicator 1 to the post 5 of the left indicator 3.

A plurality of transversely extending annular ring plates 21 are spaced along the axis of connection bodies 4a and 4b. The ring plates 21 rigidify, to an extent, the connection bodies while at the same time permitting the bodies 4a and 4b to be bent as depicted for example in FIG. 2.

The left and right indicators 3 and 2 are
respectively secured to connection bodies 4a and 4b by means of a catch slot and screw arrangement 22.

The body of each of the left and right turn indicators 3 and 2 has the general shape of the body of brake indicator 1 and each turn indicator includes its respective PC board which supports several small bulbs which generate the signaling light. The bulbs of the left and right indicators have one terminal which is grounded at terminal 16 (FIGS. 4 and 5) and a "hot" terminal. The "hot" terminal of the left indicator 3 is connected to the vehicle's factory installed left turn indicator signal line 23. Similarly, the "hot" terminal of the right indicator is connected to the vehicle's right turn indicator signal line 26.

Figure 5:
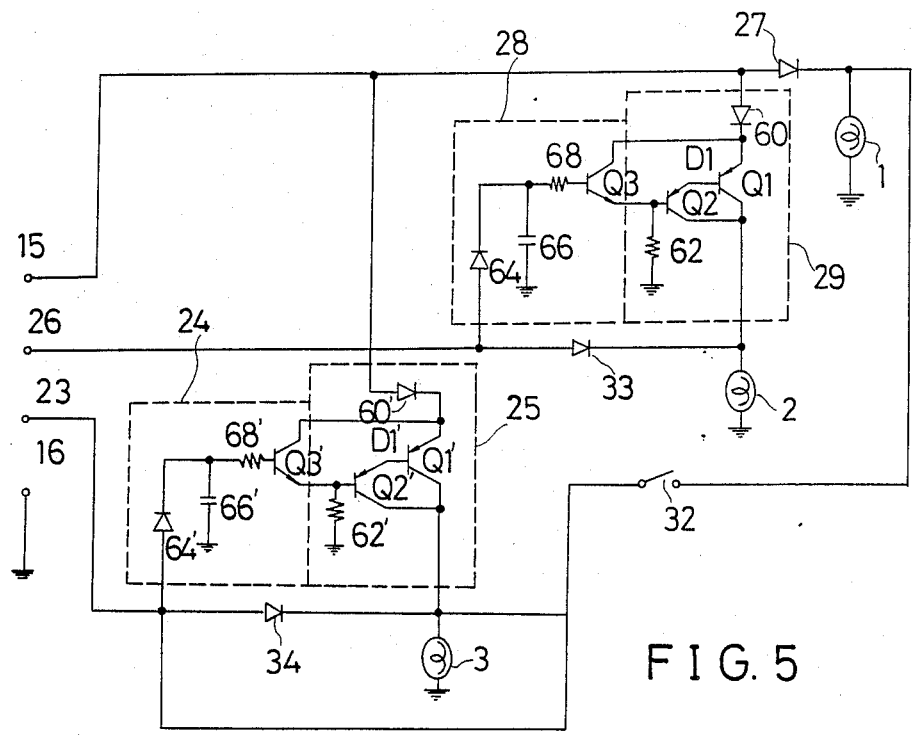
FIG. 5 is an electrical schematic of the circuit of FIG. 4.
Figure 4:
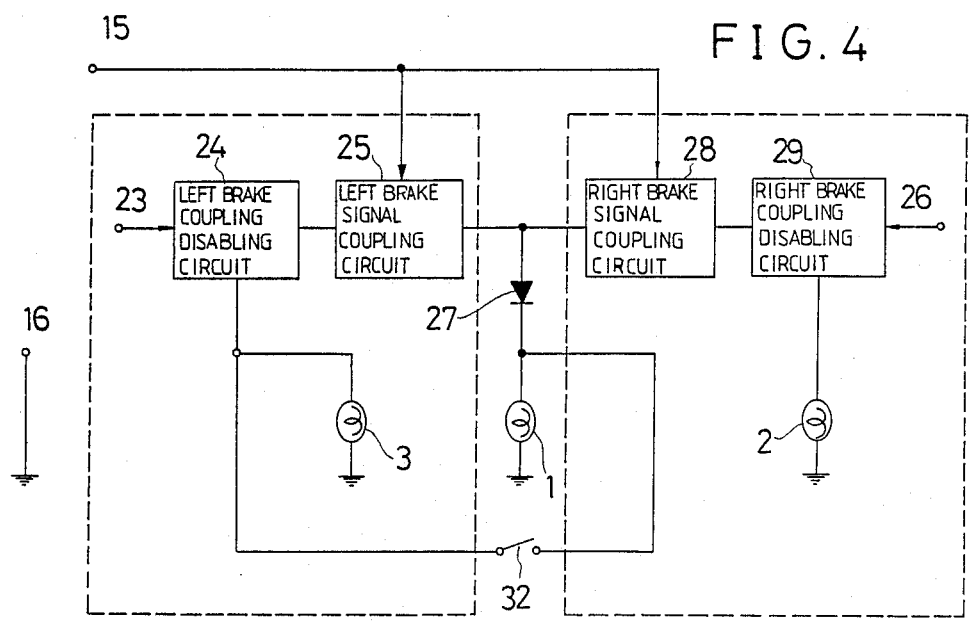
FIG. 4 is a block diagram of the electrical circuit which is associated with the auxiliary signaling device of the present invention.

Electrically, the auxiliary signaling device of the present invention is represented by the circuit which is shown at the block diagram of FIG. 4 and the corresponding schematic of FIG. 5. In FIG. 5, terminal 15 designates the brake signal line of the vehicle. The brake signal line provides a steady voltage when the brake is depressed. Lines 23 and 26 respectively represent the left and right flashing turn signal lines for the left and right indicators 3 and 2. They carry an intermittent voltage which is activated when the left or right turn switches or the emergency flashing switch of the vehicle are set to their "on" positions.

Brake signal line 15 is electrically connected to brake indicator 1 through diode 27. Brake signal line 15 is further coupled to left indicator 3 and to the right indicator 2 through the latter's respective brake signal coupling circuits 25 and 29.

Right turn signal line 26 is coupled to right turn indicator 2 via diode 33 and to a brake coupling disabling circuit 28 which operates to, at times, disable the brake signal coupling circuit 29 as will be described shortly herein.

The left turn signal line 23 is connected to left indicator light 3 via diode 34 and to brake coupling disabling circuit 24 which is associated with brake signal coupling circuit 25 of the left turn indicator.

Switch 32 connects brake indicator 1 directly to left indicator 2 and represents the electrical connection which is completed when the signaling device of the present invention is bent into its triangular shape and the ring 6 is snapped onto the post 7 as depicted in FIG. 2.

The brake signal coupling circuits 25 and 29 are identical to one another. Only circuit 29 will be described in detail. The other circuit 25 is marked with reference numerals which are directly relatable to the reference numerals of circuit 29. Thus, brake signal coupling circuit 29 includes a diode 60 which is connected to the emitter of a transistor Q1 whose base is connected to the emitter of a second transistor Q2. The collectors of transistors Q1 and Q2 are connected to one another and to the "hot" end of right turn indicator 2. The transistors Q1 and Q2 may be constituted of a single darlington transistor D1. The base of transistor Q2 is connected to ground via resistor 62.

Likewise, brake coupling disabling circuits 24 and 28 are identical to one another. Disabling circuit 28 includes a diode 64 having an anode which is coupled to line 23 and a cathode connected to one side of a capacitor 66 and to a resistor 68. The other end of capacitor 66 is connected to ground 16. Resistor 68 is connected to the base i.e. control electrode of a transistor Q3 whose emitter is connected to the base of transistor Q2 and to the emitter of transistor Q1.

As depicted in FIG. 5, transistor Q3 is an NPN transistor while transistors Q1 and Q2 are PNP transistors, preferably constituted of a single darlington transistor.

The operation of the circuit of FIG. 5 depends on the state of the signals at signal lines 15, 26, 23 and on the state of switch 32. The circuit operates as follows The brake pedal is depressed and both the turn signals and the emergency flasher of the vehicle are in their off position. In this case, line 15 carries a steady voltage and the current from terminal 15 flows through diode 27 into brake indicator 1. Hence the brake light is steadily on. Simultaneously, the current also flows through diodes 60 and 60' of brake signal coupling circuits 27 and 25 and through transistor Q1 and Q1' to steadily light turn indicators 2 and 3. Note that transistor Q1 is conducting as base current flows from the base of transistor Q2/Q2' via resistors 62/62' to ground. In short, stepping on the brake pedal causes all three sections of the auxiliary signaling device of the present invention to light up steadily.

Next, only the right turn signal is activated. Line 26 carries a flashing/intermittent voltage and the current of that voltage passes through diode 33, causing right indicator 2 to flash. However, the signal at line 26 also flows through diode 64 of brake coupling disabling circuit 28 causing capacitor 66 to charge up. This forward biases the base-emitter junction of transistor Q3 and the transistor saturates. Saturation of transistor Q3 clamps the emitter to base junction of the darlington transistor D1 in brake signal coupling circuit 29. As a result transistor Q1 is no longer able to conduct current from brake terminal 15 to right indicator 2.

Now, while the right turn signal is still active, the brake pedal is depressed. As before, the brake indicator 1 and the left turn indicator 3 are turned on and emit a steady light. The right turn indicator 2, however, continues to flash as the steady signal from line 15 is prevented from reaching that indicator.

In like fashion, when the left turn signal at line 23 is active, the left turn indicator 3 flashes and continues to flash, even if the brake pedal is depressed Moreover, if the emergency flasher of the vehicle is activated, both lines 23 and 26 provide an intermittent flashing signal and both indicators 2 and 3 and the indicator continue to flash, even if the brake pedal is depressed The above description applies when the three sections of the auxiliary signaling device of the present invention are on a straight line and the indicators complement the main brake and signaling lights of the vehicle.

To signal an emergency, the device of the present invention is readily reconfigured into a triangularly shaped emergency warning mark by bending the left and right indicator sections of the signaling device toward one another and interconnecting ring 6 and post 7. This links the indicators mechanically and electrically and produces the circuit of FIG. 5 in which the switch 32 is in its closed position. (As was noted the switch 32 represents the electrical interconnection which is effected by means of ring 6 and post 7.)

In this state, when the emergency flasher of the vehicle is activated, the left and right indicators 3 and 2 flash in response to the flashing current respectively passing through diodes 34 and 33 as previously described. In addition, however, the lamp driving voltage at left indicator 3 is coupled via switch 32 to brake indicator 1 and it too flashes in synchronism with the indicators.

Thus, the present invention provides the option of reconfiguring an ordinary auxiliary signaling device into a triangularly shaped hazard warning device. That device is constructed of three simultaneously flashing sections which are easily coupled to the conventional flashing signals in the car. The device is easily deployed by an operator of a vehicle for providing both conventional and emergency signaling functions.

Although the present invention has been described in relation to a specific embodiment thereof, many other variations and modifications will now become apparent to those skilled in the art. It is therefore preferred that the present invention be limited not by the specific disclosure herein but only by the appended claims.

What is claimed is:

1. An auxiliary signaling device for vehicles, comprising:
   a braking indicator for indicating that a vehicle is braking;
   a left turn indicator;
   a right turn indicator; and
   a first flexible connection for flexibly connecting the left turn indicator to a first location on the braking indicator and a second flexible connection for flexibly connecting the right turn indicator to a second location on the braking indicator, the braking indicator and the left and right turn indicators having a normal position for signaling braking and turning of a vehicle in which normal position all indicators are in first fixed positions relative to each other substantially along a straight line and having an emergency indicating position for indicating an emergency in which emergency indicating position the signaling device is configured into a generally triangular shape, the first and second flexible connections being bendable to enable the left and right turn indicators to be moved to cause the signaling device including the braking indicator, the left turn indicator and the right turn indicator to together assume the triangular shape.

2. A signaling device as in claim 1, in which the flexible connections are bendable to move the left and right turn indicators toward each other in the emergency indicating position.

3. A signaling device as in claim 2, in which each of the indicators includes means for emitting a respective, line-shaped, light beam and the lines are oriented so that in the first positions the lines form one line and in the emergency indicating position, the lines define a triangle.

4. A signaling device as in claim 2, further including a first connector on the left turn indicator and a second connector on the right turn indicator, the first and second connectors being connectable to one another to provide a mechanical and an electrical connection between the left and right turn indicators.

5. A signaling device as in claim 4, in which one connector comprises a first wire connection post and a snap ring secured to the first wire connection post and the other connector comprises a respective second wire connection post, the first and second connectors being electrically conductive and the snap ring being mechanically engageable with the second wire connection post when the signaling device is bent into its triangular shape.

6. A signaling device as in claim 4, wherein each of the first and second flexible connections comprises an elastic body, a soft metal plate inlaid in the elastic body and a plurality of annularly extending rings spaced along the elastic body.

7. A signaling device as in claim 6, in which at least one of the flexible connections comprises a channel extending through the elastic body and providing a passage for an electrical wire.

8. A signaling device as in claim 7, further including electrical connection means for coupling an intermittent electric signal which drives one of the left and right turn indicators to the braking indicator, the electrical connection means including the first and second connectors and passing through the channel and being effective to enable the braking indicator to flash in synchronism with the intermittent electric signal.

9. A signaling device as in claim 4, further including first and second brake signal coupling circuits respectively coupled to the left and the right turn indicators, the brake signal coupling circuits being effective for allowing light means associated with the braking indicator to simultaneously activate with lights associated with the left and the right turn indicators.

10. A signaling device as in claim 9, further including first and second brake coupling disabling circuits which are respectively coupled to the left and right turn indicators, each of the disabling circuits being effective, in response to a turn/flash signal applied thereto, for disabling its respective brake signal coupling circuit.

11. A signaling device as in claim 19, in which each of the brake signal coupling circuits includes first transistor means disposed between the braking signal and the indicator which is associated with the respective brake signal coupling circuit, and biasing means for biasing the first transistor means into a conduction state when said turn/flash signal is inactive.

12. A signaling device as in claim 11, in which the first transistor means comprise first and second PNP transistors and wherein the biasing means comprises a resistor which is connected from a base of the second transistor to ground.

13. A signaling device as in claim 12, in which each of the brake coupling disabling circuits comprises second transistor means connected to and effective for disabling the first transistor means.

14. A signaling device as in claim 13, in which the second transistor means includes a control electrode, and the turn/flash signal being coupled to the control electrode.

15. A signaling device as in claim 4, further comprising a stand for the signaling device and pivotable mounting means for pivotably connecting the indicators to the stand.

16. A signaling device as in claim 3, in which each of the indicators comprises a plurality of bulbs and the bulbs are arranged on a line within each of the indicators.

* * * * *